(12) United States Patent
Christiansen

(10) Patent No.: US 7,385,714 B2
(45) Date of Patent: Jun. 10, 2008

(54) OPTIMIZING RASTER IMAGE PROCESSING PIPELINE DATA THROUGHPUT

(75) Inventor: Robert D. Christiansen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 977 days.

(21) Appl. No.: 10/406,853

(22) Filed: Apr. 4, 2003

(65) Prior Publication Data
US 2004/0196495 A1 Oct. 7, 2004

(51) Int. Cl.
G06F 15/00 (2006.01)
G06K 1/00 (2006.01)

(52) U.S. Cl. ................................. 358/1.13; 358/1.15

(58) Field of Classification Search ............. 358/1.15, 358/1.1–1.6, 1.11–1.18, 296, 1.9; 382/303, 382/304; 718/102; 710/19
See application file for complete search history.

(56) References Cited

U.S. PATENT DOCUMENTS

| 5,287,194 | A | * | 2/1994 | Lobiondo | 358/296 |
| 5,949,438 | A | | 9/1999 | Cyman et al. | |
| 5,953,007 | A | | 9/1999 | Center et al. | |
| 6,049,390 | A | | 4/2000 | Notredame et al. | |
| 6,327,050 | B1 | | 12/2001 | Motamed et al. | |
| 6,449,053 | B2 | * | 9/2002 | Bando | 358/1.15 |
| 6,825,943 | B1 | * | 11/2004 | Barry et al. | 358/1.15 |
| 7,095,528 | B2 | * | 8/2006 | Barry et al. | 358/1.6 |

* cited by examiner

Primary Examiner—Edward L Coles
Assistant Examiner—Thierry L Pham

(57) ABSTRACT

Systems and methods for optimizing raster image process (RIP) pipeline data throughput are described. The RIP pipeline includes multiple RIP engines. In one aspect, a print job is divided into multiple partitions. The multiple partitions are at least as numerous as the number of RIP engines in the pipeline. A respective partition is distributed to each of the multiple print engines for processing into raster data. The raster data is printable by a printing device.

10 Claims, 2 Drawing Sheets

OPTIMIZING RASTER IMAGE PROCESSING PIPELINE DATA THROUGHPUT

TECHNICAL FIELD

The invention relates to printing. More particularly, the invention pertains to management of raster image processing (RIP) pipeline data throughput.

BACKGROUND

Raster image processing (RIP'ing) translates digital image data into bit-mapped device-ready data or raster bits for rendering. A RIP pipeline can be configured with multiple RIP engines to RIP respective portions of a print job to generate raster bits for printing. The pipeline can be implemented across any number of computing devices. A RIP engine can be implemented in hardware or software. Existing techniques to manage a pipeline's RIP'ing resources are substantially limited because such existing techniques often result in underutilization of the pipeline's processing capabilities. In light of this, systems and methods to improve RIP pipeline resource management are desired.

SUMMARY

Systems and methods for optimizing raster image process (RIP) pipeline data throughput are described. The RIP pipeline can utilize multiple RIP engines. In one aspect, a print job is divided into multiple partitions. The multiple partitions are at least as numerous as the number of RIP engines in the pipeline. A respective partition is distributed to each of the multiple print engines for processing into raster data for printing.

BRIEF DESCRIPTION OF THE DRAWINGS

The detailed description is described with reference to the accompanying figures.

DETAILED DESCRIPTION

Overview

The described systems and methods substantially optimize RIP'ing pipeline data throughput. In one aspect this is accomplished by dividing a print job into at least as many partitions as there are RIP engines in a pipeline. This ensures that all of the RIP resources in the pipeline are fully utilized.

In another aspect, the systems and methods substantially optimize RIP'ing pipeline data throughput by splitting the last partition of a print job into ever smaller portions (i.e., partitions). These smaller portions are distributed to respective ones of multiple RIP engines as RIP engines free-up from RIP'ing portions of the print job that precede the last partition. By splitting and distributing the last partition across multiple RIP engines, portions of the last partition are typically RIP'd in parallel. This technique results in an increase in data throughput in the pipeline as compared to what pipeline throughput would have been had the last partition not been split and instead processed with only a single RIP engine.

An Exemplary Operating Environment

Figure 1:
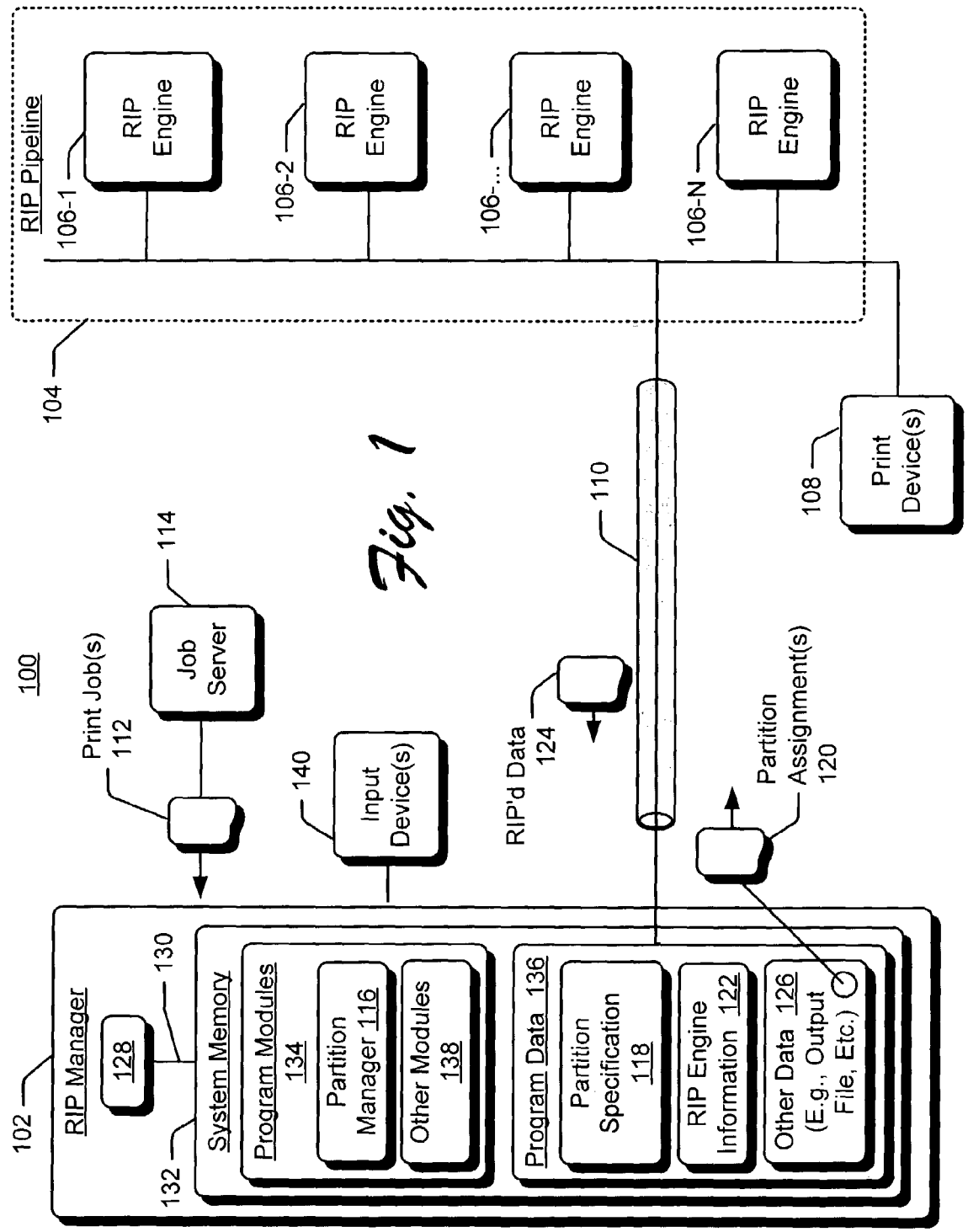
FIG. 1 is an exemplary embodiment of a suitable computing environment within which systems, apparatuses and methods to optimize raster image processing pipeline data throughput may be implemented.

Turning to the drawings, wherein like reference numerals refer to like elements, the invention is illustrated as being implemented in a suitable computing environment. FIG. 1 is an exemplary suitable computing environment 100 within which systems, apparatuses and methods to optimize raster image processing (RIP'ing) pipeline data throughput may be implemented. Exemplary computing environment 100 is only one example of a suitable computing environment and is not intended to suggest any limitation as to the scope of use or functionality of systems and methods the described herein.

Although not required, the invention will be described in the general context of computer-executable instructions, such as program modules executed in a distributed computing environment by a computer. Program modules generally include routines, programs, objects, components, data structures, etc., that perform particular tasks or implement particular abstract data types. In a distributed computing environment, program modules may be located in both local and remote memory storage devices.

As shown in FIG. 1, the exemplary computing environment 100 includes RIP manager 102, a RIP pipeline 104, one or more RIP engines 106-1 through 106-N, and one or more print device(s) 108. These components are coupled to one another over communication path 110. The communication path represents any type of physical or wireless network communication infrastructure deployed, for example, in a network such as an Intranet.

The RIP manager 102 receives a print job 112 from a job server 114. The print job includes image data for rendering onto a printing device 108. A partition manager 116 component of the RIP manager divides the print job into multiple image data partitions. A partition is a subset of the total amount of image data in a print job.

For example, the partition manager 116 may divide a three-hundred-and-twenty-one (321) page print job 112 into ten (10) partitions. In this example, each of nine (9) of the 10 partitions consists of thirty-four (34) respective print job pages, and the last partition consists of fifteen (15) pages. Although the exemplary print job was not divided into equally sized partitions, it can be appreciated that partition page sizes can vary as a function of many criteria and a print job may be divided into equally sized partitions as well. For instance, a print job may be split into some number of partitions of particular size as a function of print job size, available RIP engine 106-1 through 106-N resources, current and/or projected print shop workflow, and so on.

Once the print job 112 has been divided into partitions, the partition manager 116 updates the partition specification 118. The partition specification is updated to identify each partition, page boundaries of each partition, indications of which of the partitions have been assigned to a RIP engine 106-1 through 106-N and which have not, a mapping of which RIP engine is assigned to RIP a particular assigned partition, and an indication of whether respective RIP engines have completed RIP'ing their assigned partition(s). In one implementation, substantially unique identifiers are used to identify respective partitions and RIP engines. The number of partitions in a print job may increase when the partition manager optimizes RIP processing of a last portion of the print job. Once a partition has been assigned to a specific RIP engine for processing, the partition manager changes the assigned/unassigned status of a partition from an unassigned status to an assigned status.

To assign a partition to a RIP engine 106-1 through 106-N, the partition manager 116 communicates a copy of at least a portion of the print job 112 to the RIP engine 106-1 through 106-N along with a respective partition assignment 120, the assigned partition being encapsulated by the communicated portion. At this point, the partition manager updates the RIP engine information 122 to indicate that the RIP engine is busy, and thus should not be assigned any other partition until it has completed processing the currently assigned partition. Responsive to receiving print job image data and the partition assignment, the RIP engine proceeds to RIP the assigned partition.

In one implementation, the partition manager 116 sends the entire print job (image data for all partitions) 112 to each RIP engine. Whereas, in another implementation, the partition manager sends each RIP engine only the image data that corresponds to the partition that has been assigned to the RIP engine.

Responsive to successfully RIP'ing an assigned partition of the print job 112, a RIP engine 106-1 though 106-N produces raster image processed (RIP'd) data 124, which represents device ready bits that are compatible with the printing operations of the print device(s) 108. The partition manager 116 receives the RIP'd data via an upload or a RIP engine download operation. Responsive to receiving the RIP'd data, the partition manager updates the partition specification 118 to indicate that the corresponding partition has been RIP'd. Additionally, the partition manager updates the RIP engine operational (OP) status information 122 to indicate that the RIP engine that sent the RIP'd data is now available to RIP any currently unassigned/unRIP'd print job partitions. To this end, the partition manager 116 evaluates the partition specification 118 to identify whether any of the print job partitions remain unassigned.

If such an unassigned partition is identified, the partition manager 116 directs an available RIP engine 106-1 through 106-N to RIP at least a portion of the unassigned partition via a corresponding partition assignment 120; the operational status of the RIP engine is also updated to indicate that it is now busy. If the unassigned partition is not the last partition of the print job 112, or if the unassigned partition is the last partition and it is less than or equal to a threshold partition size, the partition manager directs the RIP engine to RIP the entire unassigned partition. Whereas, if the unassigned partition is the last partition in the print job and the last partition is larger than the threshold partition size, the partition manager directs the RIP engine to RIP only a subset of the unassigned partition.

In one implementation, when an unassigned partition is the last partition in a print job 112, the partition manager 116 splits the unassigned partition into multiple portions as a function of the number of pages in the unassigned partition, or as a function of some other print job criteria such as a determination that a particular RIP engine could process more pages (a larger partition) at a particular time as compared to the partition size that could be processed by a different RIP engine, and so on. This splitting operation creates new first and second partitions. At this point, the new first partition represents the first portion of its pre-split parent partition, and the new second partition has now become the last partition of the print job 112. The partition manager updates the partition specification 118 to reflect the splitting of the parent partition into the new first and second partitions. The parent partition is effectively removed from the system. A partition assignment 120 is communicated to an available RIP engine 106-1 through 106-N directing the RIP engine to process the new first partition. The status of the RIP engine is changed from available to busy/unavailable. The new second partition remains unassigned. As per the described last partition processing, at least a portion of the new second partition will be subsequently assigned for RIP'ing by a next available RIP engine. These steps will repeat as long as the page size of the last partition remains above a threshold limit.

Once all partitions in a print job 112 have been RIP'd, the partition manager 116 aggregates the RIP'd data 124, which is in raster/bitmap form, in sorted order into an output file for printing by a printing device 108. Such an output file is represented in "other data" 126 of FIG. 1.

An Exemplary RIP Manager Architecture

To optimize raster image processing pipeline data throughput, the RIP manager 102 includes, for example, a processor 128 coupled across a bus 130 to a system memory 132. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

System memory 132 includes a variety of computer readable media. Such media may be any available media that is accessible by the RIP manager 102, and it includes both volatile and non-volatile media, removable and non-removable media. In particular, the system memory includes computer-readable media in the form non-volatile memory, such as read-only memory (ROM), and/or volatile memory, such as random access memory (RAM). The RIP manager may further include other removable/non-removable, volatile/non-volatile computer storage media (not shown) such as a hard disk drive, a CD-ROM, a magnetic tape drive, and so on.

A RAM portion of the system memory 132 contains program modules 134 and program data 136 that are immediately accessible to and/or presently being operated on by the processor 128. For instance, the program modules includes the partition manager 116, whose operations were described in detail above, and other modules 138 such as an operating system (OS) to provide a runtime environment, a RIP resource pipeline configuration routine, and/or the like. The program data includes, for example, the partition specification 116, RIP engine information 119, and other data 126 such as configuration data, an output for printing, and/or the like.

A user may provide commands and information into the RIP manager 102 through one or more input devices 140 such as a keyboard and pointing device such as a "mouse". Other input devices may include a microphone, joystick, game pad, satellite dish, serial port, scanner, camera, etc. These and other input devices are connected to the processing unit 128 through an input interface (not shown) coupled to the bus 130, but may be connected by other interface and bus structures, such as a parallel port, game port, universal serial bus (USB), or Firewire (IEEE 1394). Optionally, the partition manager may also be coupled to a monitor (not shown).

An Exemplary Procedure

Figure 2:
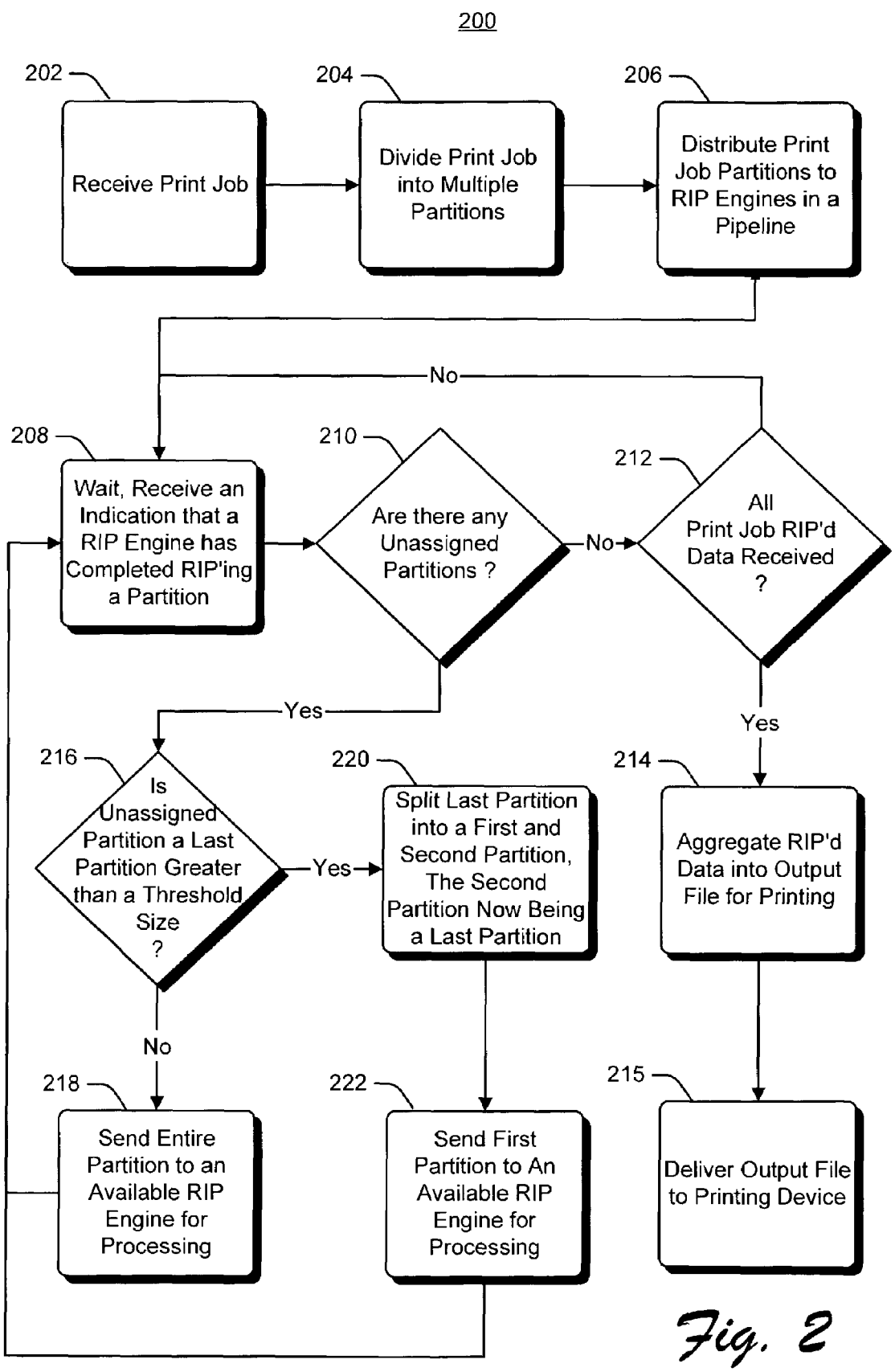
FIG. 2 shows an exemplary procedure to optimize raster image processing pipeline data throughput.

FIG. 2 shows an exemplary procedure 200 to optimize raster image processing pipeline data throughput. For purposes of discussion, operations of the exemplary procedure of FIG. 2 are described while referring to various features of FIG. 1. At block 202, the RIP manager 102 (FIG. 1) receives or otherwise accesses a print job 112 (FIG. 1). At block 204, the partition manager module component 116 (FIG. 1) divides the print job into multiple partitions. In this implementation, unless the size of the print job is too small, the number of partitions will at least be equal to the number of RIP engines 106-1 through 106-N (FIG. 1) in a target RIP pipeline 104 (FIG. 1).

A print job 112 (FIG. 1) that is too small to divide into a same number of partitions as there are RIP engines 106-1 through 106-N (FIG. 1) in a pipeline 104 (FIG. 1), for example, is a print job that would have to be divided into partition sizes that were equal or less in size than a smallest threshold partition size. Such a smallest threshold partition size can be based on any number of criteria such as heuristics that indicate that a partition size smaller than the smallest threshold partition size would result in an increase in system processing overhead. However, a print job is typically be divided into a number of partitions that is equal or greater than the number of RIP engines in the pipeline to take advantage of the described systems and methods to optimize raster image processing pipeline data throughput.

At block 206, the partition manager 116 (FIG. 1) distributes the print job partitions to respective ones of the RIP engines 106-1 through 106-N in the pipeline 104 (FIG. 1). This is accomplished by communicating, for example, the print job 112 (FIG. 1) and respective partition assignment messages 120 (FIG. 1) to the RIP engines. The partitions are distributed in sequential order. In other words, consider that a print job consists of first, second and third partitions that are also represented in that order in the print job. The third partition is not distributed for processing until after the first and second partitions have been distributed for processing, and the like.

At this point the RIP engines 106-1 through 106-N (FIG. 1) in the pipeline 104 (FIG. 1) begin RIP'ing their respective assigned partitions. At block 208, the partition manager 116 (FIG. 1) determines that RIP'ing operations on a respective partition have completed. In one implementation this is accomplished via communication of an operation complete status message from a RIP engine 106-1 through 106-N (FIG. 1) to the partition manager. The operation complete status message is represented as a portion of "other data" 126 of FIG. 1. Responsive to receipt of such a message, the partition manager 116 (FIG. 1) downloads RIP'd data 124 from the RIP engine. In another implementation, the indication of block 208 is via receipt by the partition manager of RIP'd data from a RIP engine.

At block 210, the partition manager 116 (FIG. 1) determines whether there are any partitions that still need to be assigned and distributed to a RIP engine 106-1 through 106-N (FIG. 1) for processing. Such assigned/unassigned partition statuses are maintained in the partition specification 116 (FIG. 1) by the partition manager. When all partitions have been assigned to a respective RIP engine for processing, at block 212, the partition manager determines whether RIP'd data 124 for all partitions in the print job has been received. If not, the procedure continues at block 208 as described above. Otherwise, at block 214, the RIP manager 102 aggregates, in sorted order, the RIP'd data to generate an output file for printing by a printing device 108 (FIG. 1). At block 215, the RIP manager communicates the output file to the printer for printing and the procedure ends.

Otherwise, it has been determined at block 210 that there are one or more partitions that have yet to be assigned and distributed for RIP'ing. At block 216, the partition manager 116 (FIG. 1) determines whether a next unassigned partition is a last partition that is greater than a threshold partition size. As with the smallest threshold partition size, the threshold partition size is determined heuristically and/or as a function of processing overhead. At block 218, it having been determined that the unassigned partition is not a last partition that is greater than the threshold size, the unassigned partition is assigned to an available RIP engine 106-1 through 106-N for processing. If the unassigned partition is the last partition that is less than or equal to the threshold partition size, the unassigned partition is the last partition in the print job to be RIP'd.

At block 220, it has been determined that the unassigned partition is the last partition in the print job 112 (FIG. 1) and that the unassigned partition is greater than a threshold partition size. At this point, the procedure substantially optimizes pipeline operations to RIP the unassigned partition. Specifically, at block 220, the unassigned partition is split into respective first and second partitions and the unassigned partition is discarded. The second partition is now the (new) last partition in the print job. At block 222, the first of the first and second partitions is sent to an available RIP engine 106-1 through 106-N for processing. The operations of respective ones of the blocks 206 through 222 are repeated until the last partition is no larger than the threshold partition size. When this occurs, the entire last partition is distributed to an available RIP engine for processing.

CONCLUSION

The described systems and methods provide for optimizing raster image processing pipeline throughput. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A computer-readable medium for optimizing raster image process (RIP) pipeline data throughput, the RIP pipeline including multiple RIP engines, the computer-readable medium comprising computer-program instructions executable by a processor for:

splitting a last partition of a print job into ever smaller portions;

distributing the ever smaller portions to respective ones of the multiple RIP engines as RIP engines free-up from RIP'ing portions of the print job that precede the last partition, the distributing being performed until a pre-split portion representing a new last partition reaches a threshold size, the pre-split portion for communication to a RIP engine of the multiple RIP engines for processing, wherein the multiple partitions are more numerous than the multiple RIP engines, and wherein after the computer-program instructions for distributing the computer-program instructions further comprise instructions for:

(a) determining that a RIP engine of the multiple RIP engines has finished processing a respective one of the multiple partitions;

(b) identifying an unassigned partition of the multiple partitions:

(c) if the unassigned partition is greater than a threshold partition size and if the unassigned partition is a last partition of the multiple partitions:

continually splitting the last partition into first and second partitions;

distributing the first partition to the RIP engine for processing, the second partition now being an unassigned and a last partition; and repeating (a), (b), and (c);

(d) if the unassigned partition is the last partition and less than or equal to the threshold partition size, or if the unassigned partition is not the last partition, distributing the unassigned partition to the RIP engine for processing.

2. A computer-readable medium as recited in claim 1, wherein the multiple partitions are more numerous than the multiple RIP engines, and wherein after the computer-program instructions for distributing the computer-program instructions further comprise instructions for:

identifying a RIP engine of the multiple RIP engines that has finished processing a respective one of the multiple partitions;

locating an unassigned partition of the multiple partitions:

determining that the unassigned partition is not a last partition of the multiple partitions; and responsive to determining that the unassigned partition is not the last partition, communicating the unassigned partition to the RIP engine for processing.

3. A computer-readable medium as recited in claim 2, wherein the computer-program instructions further comprise instructions for repeating operations of identifying, locating, determining, and communicating until the unassigned partition is the last partition.

4. A computer-readable medium as recited in claim 1, wherein the multiple partitions are more numerous than the multiple RIP engines, and wherein after the computer-program instructions for distributing the computer-program instructions further comprise instructions for:

identifying a RIP engine of the multiple RIP engines that has finished processing a respective one of the multiple partitions;

locating an unassigned partition of the multiple partitions:

determining that the unassigned partition is a last partition of the multiple partitions; and responsive to determining that the unassigned partition is the last partition:

splitting the last partition into first and second partitions; and communicating the first partition to the RIP engine for processing, the second partition now being an unassigned partition and a last partition, the last partition being queued for processing by a next available RIP engine of the multiple RIP engines.

5. A computer-readable medium as recited in claim 4, wherein the computer-program instructions further comprise instructions for:

repeating operations of identifying, locating, determining, splitting, and communicating until the last partition is less that or equal to a threshold partition size; and responsive to calculating that the last partition is less that or equal to the threshold partition size, distributing the last partition without splitting the last partition to the RIP engine for processing.

6. A computing device for optimizing raster image process (RIP) pipeline data throughput, the RIP pipeline including multiple RIP engines, the computing device comprising:

means for splitting a last partition of a print job into ever smaller portions;

means for distributing the ever smaller portions to respective ones of the multiple RIP engines as RIP engines free-up from RIP'ing portions of the print job that precede the last partition, the distributing being performed until a pre-split portion representing a new last partition reaches a threshold size; and means for communicating the pre-split portion to a RIP engine of the multiple RIP engines for processing, wherein the multiple partitions are more numerous than the multiple RIP engines, and wherein the computing device further comprises:

(a) means for determining that a RIP engine of the multiple RIP engines has finished processing a respective one of the multiple partitions;

(b) means for identifying an unassigned partition of the multiple partitions:

(c) means for if the unassigned partition is greater than a threshold partition size and if the unassigned partition is a last partition of the multiple partitions:

means for continually splitting the last partition into first and second partitions;

means for distributing the first partition to the RIP engine for processing, the second partition now being an unassigned and a last partition; and repeating (a), (b), and (c);

(d) if the unassigned partition is the last partition and less than or equal to the threshold partition size, or if the unassigned partition is not the last partition, means for communicating the unassigned partition to the RIP engine for processing.

7. A computing device as recited in claim 6, wherein the multiple partitions are more numerous than the multiple RIP engines, and wherein the means for distributing further comprises:

means for identifying a RIP engine of the multiple RIP engines that has finished processing a respective one of the multiple partitions;

means for locating an unassigned partition of the multiple partitions:

means for determining that the unassigned partition is not a last partition of the multiple partitions; and responsive to determining that the unassigned partition is not the last partition, means for communicating the unassigned partition to the RIP engine for processing.

8. A computing device as recited in claim 7, wherein the computing device further comprises means for repeating operations of identifying, locating, determining, and communicating until the unassigned partition is the last partition.

9. A computing device as recited in claim 6, wherein the multiple partitions are more numerous than the multiple RIP engines, and wherein after the means for distributing the computing device further comprises:

means for identifying a RIP engine of the multiple RIP engines that has finished processing a respective one of the multiple partitions;

means for locating an unassigned partition of the multiple partitions:

means for determining that the unassigned partition is a last partition of the multiple partitions; and responsive to determining that the unassigned partition is the last partition:

means for splitting the last partition into first and second partitions; and means for communicating the first partition to the RIP engine for processing, the second partition now being an unassigned partition and a last partition, the last partition being queued for processing by a next available RIP engine of the multiple RIP engines.

10. A computing device as recited in claim 9, and wherein the computing device further comprises:

means for repeating operations of identifying, locating, determining, splitting, and communicating until the last partition is less that or equal to a threshold partition size; and responsive to calculating that the last partition is less that or equal to the threshold partition size, means for distributing the last partition without splitting the last partition to the RIP engine for processing.

* * * * *

UNITED STATES PATENT AND TRADEMARK OFFICE
CERTIFICATE OF CORRECTION

| | | |
|---|---|---|
| PATENT NO. | : 7,385,714 B2 | Page 1 of 1 |
| APPLICATION NO. | : 10/406853 | |
| DATED | : June 10, 2008 | |
| INVENTOR(S) | : Robert D. Christiansen | |

It is certified that error appears in the above-identified patent and that said Letters Patent is hereby corrected as shown below:

In column 7, line 5, in Claim 1, after "partitions" delete ":" and insert -- ; --, therefor.

In column 7, line 67, in Claim 5, delete "less that" and insert -- less than --, therefor.

In column 8, line 1, in Claim 5, delete "less that" and insert -- less than --, therefor.

In column 8, line 25, in Claim 6, after "partitions" delete ":" and insert -- ; --, therefor.

In column 10, line 5, in Claim 10, delete "less that" and insert -- less than --, therefor.

In column 10, line 7, in Claim 10, delete "less that" and insert -- less than --, therefor.

Signed and Sealed this

Eighteenth Day of August, 2009

David J. Kappos
*Director of the United States Patent and Trademark Office*